Dec. 6, 1949  E. KOLLER  2,490,525
STEPLESSLY VARIABLE SPEED-CHANGING GEAR
Filed July 8, 1946
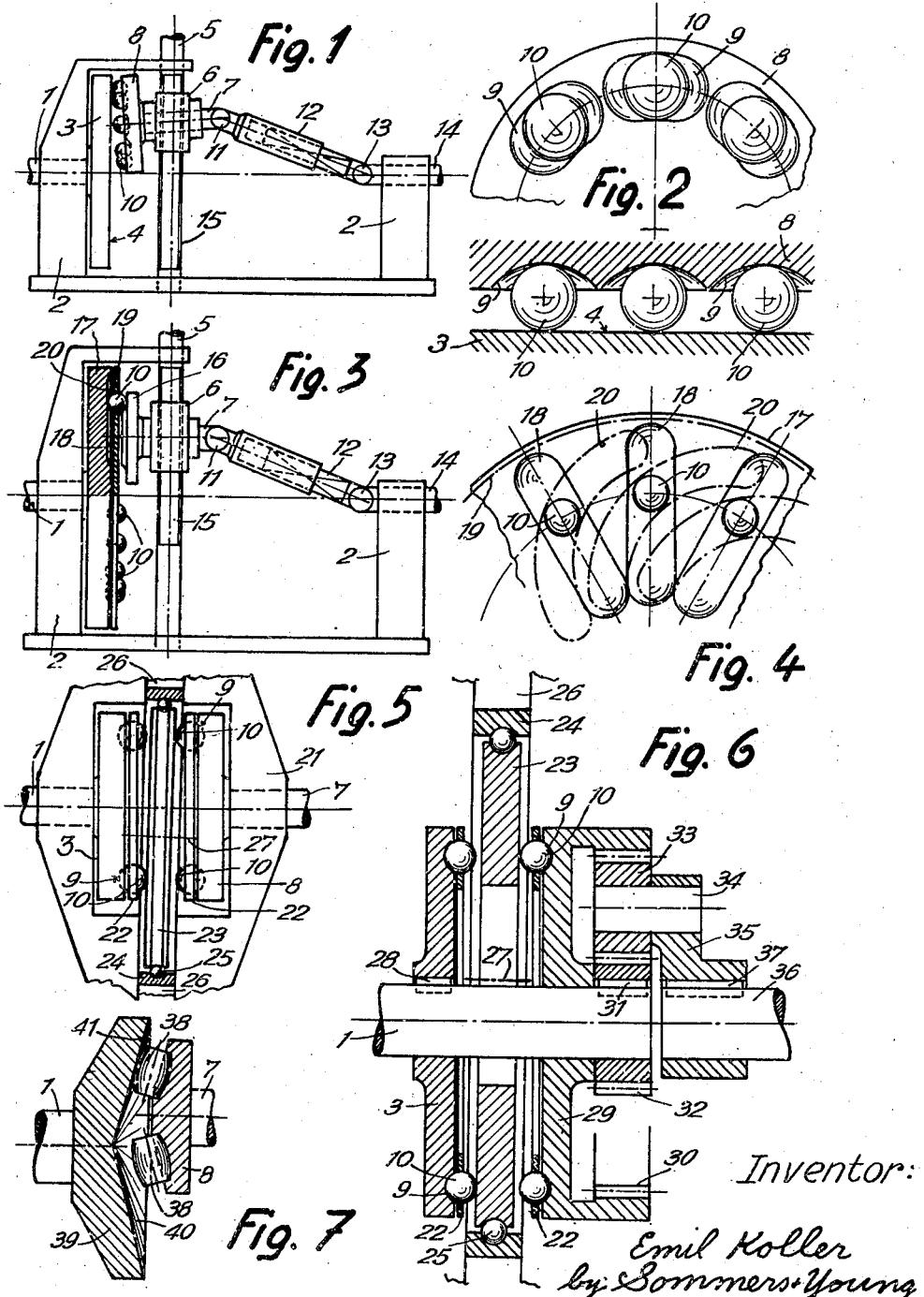
Inventor:
Emil Koller
by Sommers + Young
Attorneys Patented Dec. 6, 1949

2,490,525

UNITED STATES PATENT OFFICE 2,490,525

STEPLESSLY VARIABLE SPEED-CHANGING GEAR

Emil Koller, Zurich, Switzerland, assignor to Dabo Ltd., Zug, Switzerland

Application July 8, 1946, Serial No. 681,872
In Switzerland May 10, 1946

3 Claims. (Cl. 74—796)

Steplessly variable speed-changing gears are known in the art, in which the torque is transmitted solely by frictional forces. The positive operation of such gears is uncertain, particularly at overloads, due to slippage, and their wear is excessive, which deficiencies alone render their application in many cases practically impossible. Such frictional change-speed gears, moreover, only may be applied for limited power transmission, and necessitate comparatively great structural dimensions even for relatively small torques. Such latter circumstance also holds true for change-speed gears operating by means of V-belts or special chains, as well as for all kinds of hydraulic speed-changing gears. A further disadvantage of all speed-changing gears is the comparatively small regulating range, limited by their mode of operation.

The object of my present invention is to eliminate such disadvantages. To this end, my present invention of a steplessly variable speed-changing gear comprises rollers for producing a blocking action, disposed annularly between adjacent or opposite rotary discs, i. e. mounted on the one disc and only contacting the other disc in a given circular track thereof. The two rotary discs are positively engaged with each other by virtue of the locking action set up by the rollers; and the transmission ratio may be varied by radially acting adjusting means.

The structure of my present invention affords, in a comparatively simple way and manner, a compact design of the speed-changing gear even in case of a great regulating range. Fundamentally, there is no restriction as to the magnitude of the power transmission. Various forms of invention are illustrated, partly schematically, in the accompanying drawing, in which:

Fig. 1 shows a first form in elevation,

Fig. 2, in larger scale, the mounting of the rollers in a partial side view, and in section, Fig. 3 a second form in elevation, partly in section, Fig. 4, in larger scale, the mounting of the rollers, in part elevation, Fig. 5 a third form in elevation, partly in section, Fig. 6 a fourth form in axial section, and Fig. 7 a portion of a further form, in axial section.

In Fig. 1, the shaft 1, mounted in the frame 2, has a disc 3 secured to its shown end, and the operating face 4 of the disc 3 is perfectly plane. A guide spindle 5 is disposed parallel to the said face 4 and, therefore, at right angles to the shaft 1. A bearing block 6 for a stub shaft 7 is disposed displaceably on the spindle 5. A disc 8, facing the disc 3, is secured to one end of the stub shaft 7, and its surface opposite the face 4 is provided with a plurality of recessed seats 9 for a ball 10 each. The seats 9 are circularly disposed, concentric with the stub shaft 7; and the balls 10 are retained on the rotary disc 8 by a cage not shown. The stub shaft 7 is in engagement with a telescope shaft 12 by means of a universal joint 11, and the shaft 12 is connected to a shaft 14 through the intermediary of a second universal joint 13. The last-mentioned shaft 14 is mounted rotatably in the frame 2, coaxial with the shaft 1. The displaceable bearing block 6 is engaged by the spindle 5, by means of threads 15, so that, upon rotating the spindle, the disc 8 may be displaced relative to the disc 3, that is radially adjusted relative to the axis 1—14, the telescope shaft 12 automatically being adjusted in length as required.

As shown in Fig. 1, the disc 8 is inclined relative to the disc 3, and the balls 10 of the skew disc 8 thus contact the face 4 of the disc 3 along a circular track concentric to the shaft 1. The skew disc 8 is of substantially smaller diameter than the disc 3. The recessed ball seats 9 on the skew disc 8 are formed, according to Fig. 2, by longitudinal recesses tapered endwise, wherein the balls 10 are guided circumferentially on the disc 8 with certain limited play in either sense of rotation of the latter.

When, now, from the shaft 14 the skew disc 8 is driven in the one or other direction of rotation, the balls 10 become seized in their seats in the given circular track on the face 4, thus positively engaging the two rotary discs 3 and 8 which, of course, are secured against axial displacements. Such engagement is afforded by virtue of the incoming torque producing a locking action between the two rotary discs 3 and 8 through the intermediary of the balls 10, which locking action always corresponds in magnitude to the power to be transmitted at any one time. The transmission ratio may be steplessly varied, within given limits, by radially displacing the stub shaft 7 and the skew disc 8 relative to the disc 3, as will be readily appreciated.

In the form of invention shown in Fig. 3, a disc 16 is secured to the stub shaft 7, and the disc 17 disposed beside the disc 16 is parallel to the latter and secured to the shaft 1. The disc 17 is provided with radial grooves 18 which form seats for the balls 19. The latter are retained by a ring 19 in the said grooves 18 which are tapered in cross-section toward the longitudinal brims, and the said ring is provided with a curved guide slot 20 for each ball 10.

By turning the ball cage 19 relative to the rotary disc 17, the radial distance of the balls 10 from the axis 1—14 may be varied for the purpose of changing the transmission ratio.

Elements of the form of invention shown in Figs. 1 and 2, are used in the structure according to Fig. 5. The two parallel discs 3 and 8, provided with recessed seats 9 for the balls 10, together with the coaxial shafts 1 and 7, are mounted in a case 21. The balls 10 appurtenant to each disc 3 and 8, are retained in cages 22. A skew disc 23, provided with plane faces, is rotatably mounted in a ring 24 by means of balls 25, intermediate of the discs 3 and 8. The ring 24 is displaceable, by means of an adjusting device, in a guide slot 26 in the plane of the skew disc 23, which latter is so positioned as to contact on either face a ball 10 each of the two discs 3 and 8, the said two balls 10 or, respectively, the points of contact defined thereby being diametrically opposite each other. The axis of the skew disc 23 is denoted by 27.

When the latter coincides with the axis 1—7, the transmission ratio is 1:1 or 1. When, however, the ring 24 with the skew disc 23 is displaced from such position, its axis 27 is moved toward or away from the axis 1—7, and a corresponding effective difference of radius of the two diametrically opposite contact balls 10 is set up so that the transmission ratio between the discs 3 and 8 may be steplessly varied in one sense or the other.

In Fig. 6, the one shaft again is denoted by 1, and the disc 3 is provided with recessed seats 9 for balls 10 retained and guided in the cage 22. The disc 3 is secured against rotation on the shaft 1 by the key 28. The skew disc 23 is disposed intermediate of the rotary disc 23 and a flanged rotary disc 29, and is provided with a central aperture for the passage of the shaft 1. The disc 29 is provided with recessed seats 9 for balls 10 guided in another cage 22. The disc 29 is provided with an inside rim gear 30 and mounted rotatable on the shaft 1, and a central spur gear wheel 32 is secured to the latter by a key 31. A planet wheel 33 engages the central spur wheel 32, and its pivot 34 is mounted in the bearing structure 35 which is secured to the shaft 36 coaxial with the shaft 1 by a key 37.

When the shaft 1 rotates at constant speed, the operation of the change-speed gear is as follows:

As described with reference to Fig. 5, the speed between the discs 3 and 29 may be varied in the form of invention shown in Fig. 6 by means of the skew disc 23. The speed of the rim gear 30 relative to that of the central wheel 32 may be varied positively or negatively, i. e. leading or lagging, by rolling off the planet wheel intermediate of the gear wheels 30 and 32 in the one sense of rotation or the other. The speed of the pivot 34 or of the shaft 36 respectively, is composed of the speed of the shaft 1 and the relative speed of the planet wheel 33, which may be positive or negative. By correspondingly selecting the relative dimensions of the gear elements in question, therefore, the speed of the shaft 36 may be reduced to zero or the resulting rotation reversed.

In the form of invention shown in Fig. 7, the rollers or locking elements 38 are crowned and are mounted on and in the rotary disc 8 secured to the stub shaft 7, in seats adapted as described with reference to Fig. 2 for the balls 10. The radially adjustable rotary disc 39 is provided with an inverted plane conical recess 40 forming a counterface for the rollers 38 so as to ensure a smooth transmission. The disc 39 is displaced, for the purpose of changing the transmission ratio, parallel to the generatrix 41; the operation of this form of gear otherwise is similar to that of Fig. 1.

The design of my present speed-changing gear also may be such as to permit of applying the locking action only in the one sense of rotation of the disc provided with the recessed seats for the rollers. Further, e. g. with reference to Fig. 4, the ball seats 18 may be disposed in chords instead of radially as shown.

What I claim and desire to secure by Letters Patent is:

1. A mechanical, infinitely variable change speed gear, comprising at least two round rotational discs disposed eccentrically with respect to each other, one of said discs having an annular series of locking roller members disposed thereon concentric with the axis of said one disc, the axes of said two rotational discs being disposed obliquely with respect to each other, the said annular series of locking roller members being in power transmitting contact with the other rotational disc, and mechanical means connected with one of the rotational discs for effecting relative radial displacement of the latter said one of the rotational discs with respect to the axis of the other rotational disc.

2. Mechanical infinitely variable change speed gear comprising two round rotational discs disposed coaxially to each other, each of said discs having an annular series of locking roller members disposed concentric to the axis of their respective disc, and a round middle disc disposed between the aforesaid two rotational discs and eccentrically disposed with respect to their common axis, said middle disc being disposed obliquely to the two other rotational discs said oblique disc being laterally engaged in power transmitting contact with the two annular series of locking roller members, a bearing rotatably mounted on said middle disc, means including a guide for moving said bearing and said middle disc radially of said middle disc, the eccentric position of the midle disc being thereby varied with respect to the two other rotational discs to alter the drive ratio between the two outer rotational discs.

3. A change gear according to claim 2, and in which one of the two rotational discs provided with a series of locking roller members is formed with teeth to constitute a part of a planetary gearing.

EMIL KOLLER.

REFERENCES CITED

The following references are of record in the file of this patent:

UNITED STATES PATENTS

| Number | Name | Date |
| --- | --- | --- |
| 1,146,982 | Weiss | July 20, 1915 |
| 2,019,006 | Ferrari | Oct. 29, 1935 |
| 2,163,066 | Searcy | June 20, 1939 |